(12) United States Patent
Tiwari et al.

(10) Patent No.: US 11,611,562 B2
(45) Date of Patent: Mar. 21, 2023

(54) NETWORK ASSET VULNERABILITY DETECTION

(71) Applicant: HONEYWELL INTERNATIONAL INC., Charlotte, NC (US)

(72) Inventors: Sapna Tiwari, Charlotte, NC (US); Tarun Gupta, Charlotte, NC (US); Anusha C, Charlotte, NC (US); Chandrika Rout, Charlotte, NC (US); Atul Bassi, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 17/204,447

(22) Filed: Mar. 17, 2021

(65) Prior Publication Data
US 2021/0306341 A1    Sep. 30, 2021

(30) Foreign Application Priority Data

Mar. 26, 2020   (IN) .............................. 202041013229

(51) Int. Cl.
*H04L 9/40* (2022.01)
(52) U.S. Cl.
CPC ........ *H04L 63/102* (2013.01); *H04L 63/0236* (2013.01); *H04L 63/0876* (2013.01); *H04L 63/166* (2013.01)

(58) Field of Classification Search
CPC ............... H04L 63/102; H04L 63/0236; H04L 63/0876; H04L 63/166; H04L 63/1433; H04L 2463/121
See application file for complete search history.

(56) References Cited

U.S. PATENT DOCUMENTS

| | | | | |
|---|---|---|---|---|
| 7,346,922 B2* | 3/2008 | Miliefsky | ........... | H04L 63/0272 726/4 |
| 9,021,595 B2* | 4/2015 | Schrecker | ........... | H04L 63/1433 726/25 |
| 11,075,939 B2* | 7/2021 | Hamdi | .................... | H04L 63/20 |
| 2015/0222654 A1* | 8/2015 | Crowley | ................. | H04L 67/10 726/25 |

* cited by examiner

*Primary Examiner* — Amie C. Lin
(74) *Attorney, Agent, or Firm* — Alston & Bird LLP

(57) ABSTRACT

There is a need for more effective and efficient network security coordination. This need can be addressed by, for example, techniques for network asset vulnerability detection. In one example, a method includes detecting network assets within a monitored computer network; and for each network asset: determining a vulnerability profile, determining a connectivity profile, determining a vulnerability designation based on the vulnerability profile for the network asset and a network vulnerability documentation repository, determining whether the vulnerability designation for the network asset indicates a positive vulnerability designation, and in response to determining that the vulnerability designation indicates the positive vulnerability designation, decoupling the network asset from the monitored computer network using the connectivity profile for the network asset.

20 Claims, 9 Drawing Sheets

NETWORK ASSET VULNERABILITY DETECTION

CROSS-REFERENCE TO RELATED APPLICATIONS

This application claims priority pursuant to 35 U.S.C. 119(a) of India Patent Application No. 202041013229, filed Mar. 26, 2020, which application is incorporated herein by reference in its entirety.

BACKGROUND

Various embodiments of the present invention address technical challenges related to performing network security management. Various embodiments of the present invention disclose innovative techniques for performing network security management by utilizing network asset vulnerability detection.

BRIEF SUMMARY

In general, embodiments of the present invention provide methods, apparatuses, systems, computing devices, and/or the like for performing network asset vulnerability detection. Various embodiments of the present invention disclose techniques for performing network asset vulnerability detection by utilizing at least one of per-network-asset vulnerability profiles, per-network-asset connectivity profiles, and network vulnerability documentation repositories.

In accordance with one aspect, a method is provided. In one embodiment, the method comprises detecting a plurality of network assets within the monitored computer network; and for each network asset of the plurality of network assets: determining a vulnerability profile for the network asset, wherein the vulnerability profile for the network asset comprises: (i) an operating system designation for the network asset, (ii) an open ports list for the network asset, and (iii) a network functionality designation for the network asset; determining a connectivity profile for the network asset, wherein the connectivity profile for the network asset comprises a connected asset network asset describing a linked subset of the plurality of network assets for the network asset; determining a vulnerability designation for the network asset based on the vulnerability profile for the network asset and a network vulnerability documentation repository; determining whether the vulnerability designation for the network asset indicates a positive vulnerability designation; and in response to determining that the vulnerability designation indicates the positive vulnerability designation, decoupling the network asset from the monitored computer network using the connectivity profile for the network asset.

In accordance with another aspect, a computer program product is provided. The computer program product may comprise at least one computer-readable storage medium having computer-readable program code portions stored therein, the computer-readable program code portions comprising executable portions configured to detect a plurality of network assets within the monitored computer network; and for each network asset of the plurality of network assets: determine a vulnerability profile for the network asset, wherein the vulnerability profile for the network asset comprises: (i) an operating system designation for the network asset, (ii) an open ports list for the network asset, and (iii) a network functionality designation for the network asset; determine a connectivity profile for the network asset, wherein the connectivity profile for the network asset comprises a connected asset network asset describing a linked subset of the plurality of network assets for the network asset; determine a vulnerability designation for the network asset based on the vulnerability profile for the network asset and a network vulnerability documentation repository; determine whether the vulnerability designation for the network asset indicates a positive vulnerability designation; and in response to determining that the vulnerability designation indicates the positive vulnerability designation, decouple the network asset from the monitored computer network using the connectivity profile for the network asset.

In accordance with yet another aspect, an apparatus comprising at least one processor and at least one memory, including computer program code, is provided. In one embodiment, the at least one memory and the computer program code may be configured to, with the processor, cause the apparatus to detect a plurality of network assets within the monitored computer network; and for each network asset of the plurality of network assets: determine a vulnerability profile for the network asset, wherein the vulnerability profile for the network asset comprises: (i) an operating system designation for the network asset, (ii) an open ports list for the network asset, and (iii) a network functionality designation for the network asset; determine a connectivity profile for the network asset, wherein the connectivity profile for the network asset comprises a connected asset network asset describing a linked subset of the plurality of network assets for the network asset; determine a vulnerability designation for the network asset based on the vulnerability profile for the network asset and a network vulnerability documentation repository; determine whether the vulnerability designation for the network asset indicates a positive vulnerability designation; and in response to determining that the vulnerability designation indicates the positive vulnerability designation, decouple the network asset from the monitored computer network using the connectivity profile for the network asset.

BRIEF DESCRIPTION OF THE DRAWINGS

Figure 1:
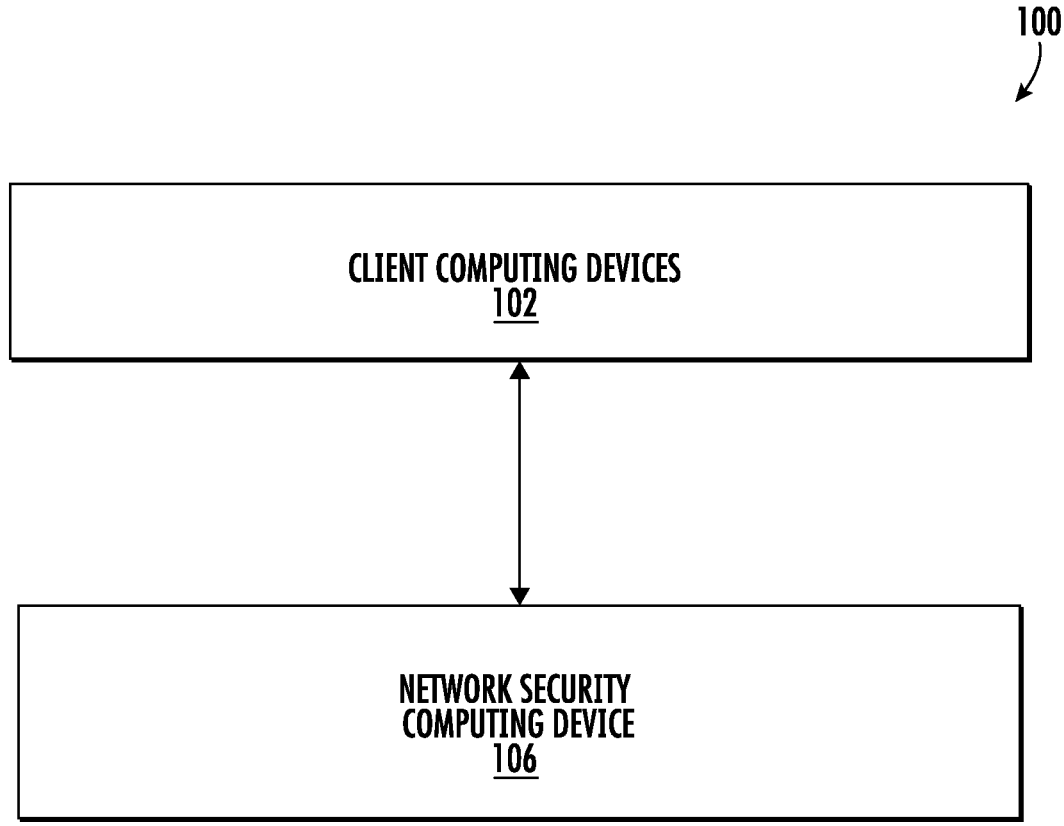

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
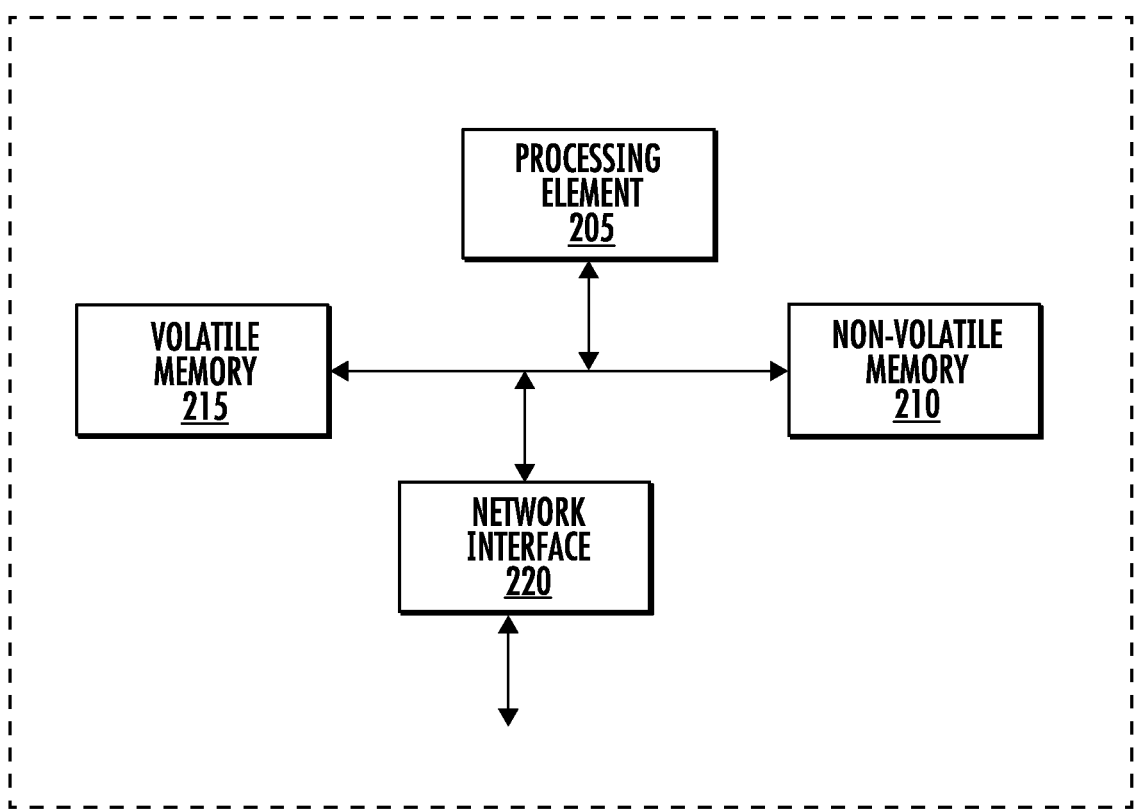

FIG. 2 provides an example network security computing device in accordance with some embodiments discussed herein.

Figure 3:
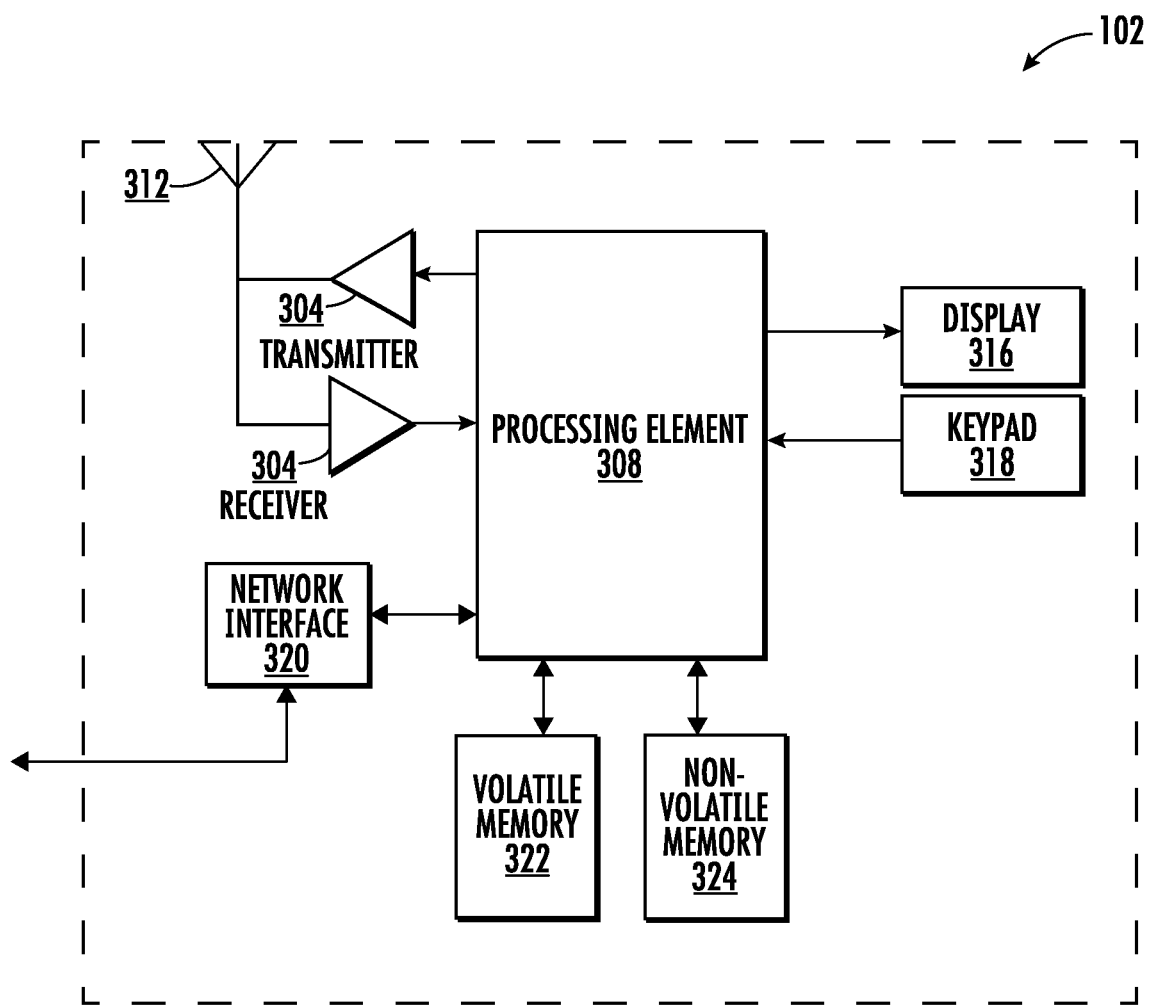

FIG. 3 provides an example client computing device in accordance with some embodiments discussed herein.

Figure 4:
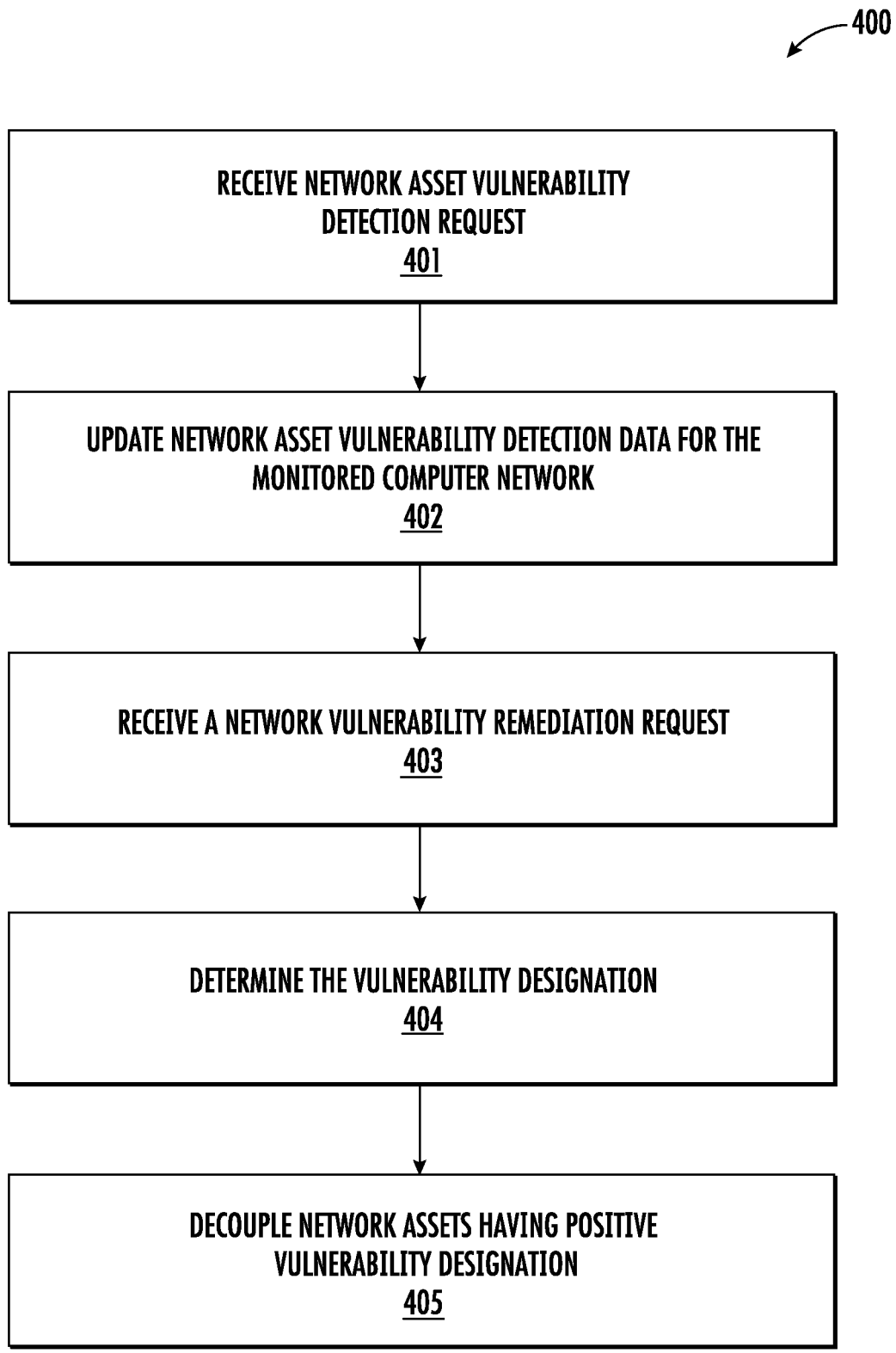

FIG. 4 is a flowchart diagram of an example process for performing network assert vulnerability detection in accordance with some embodiments discussed herein.

Figure 5:
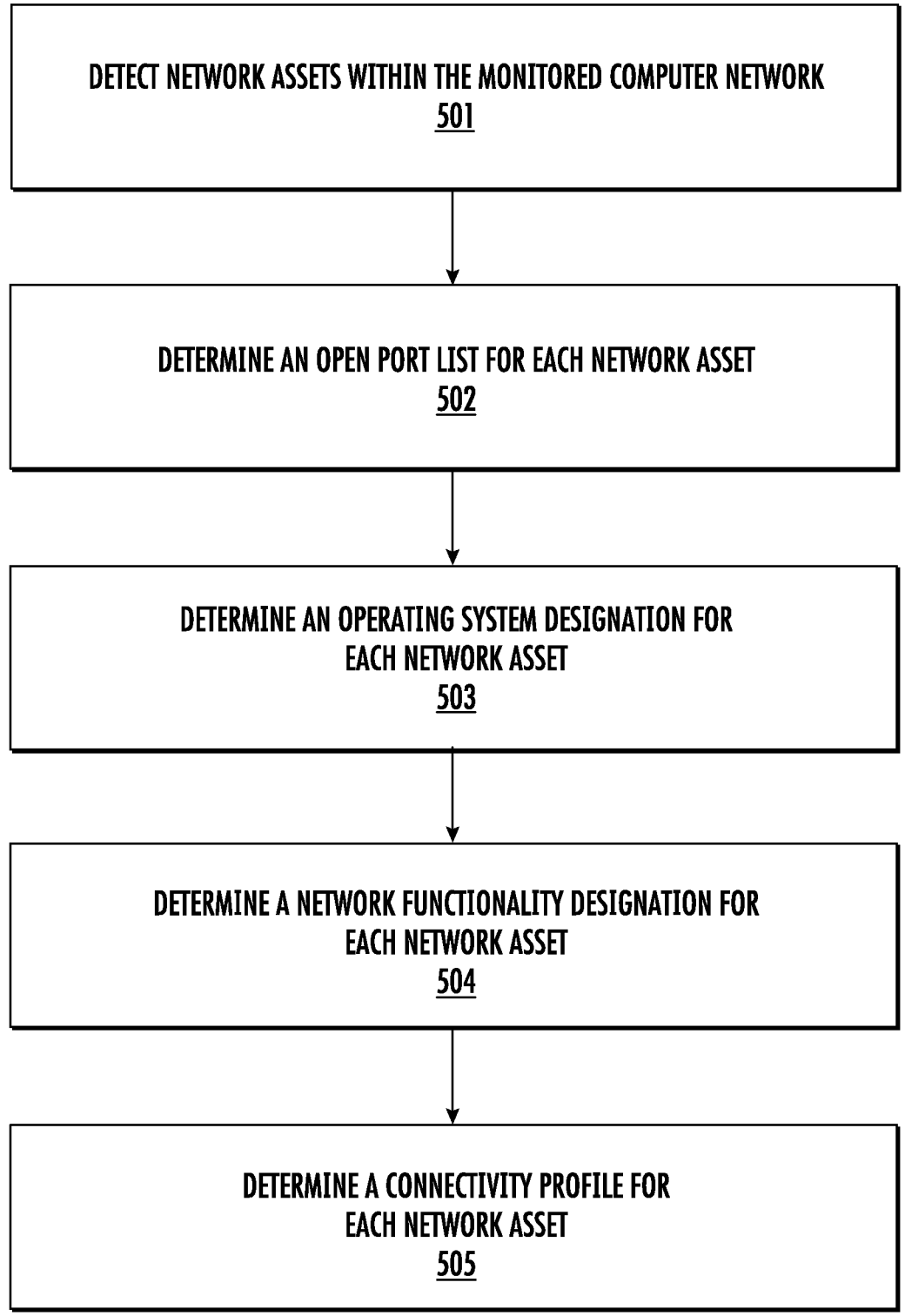

FIG. 5 is a flowchart diagram of an example process for updating network asset vulnerability detection data for a monitored computer network in accordance with some embodiments discussed herein.

Figure 6:
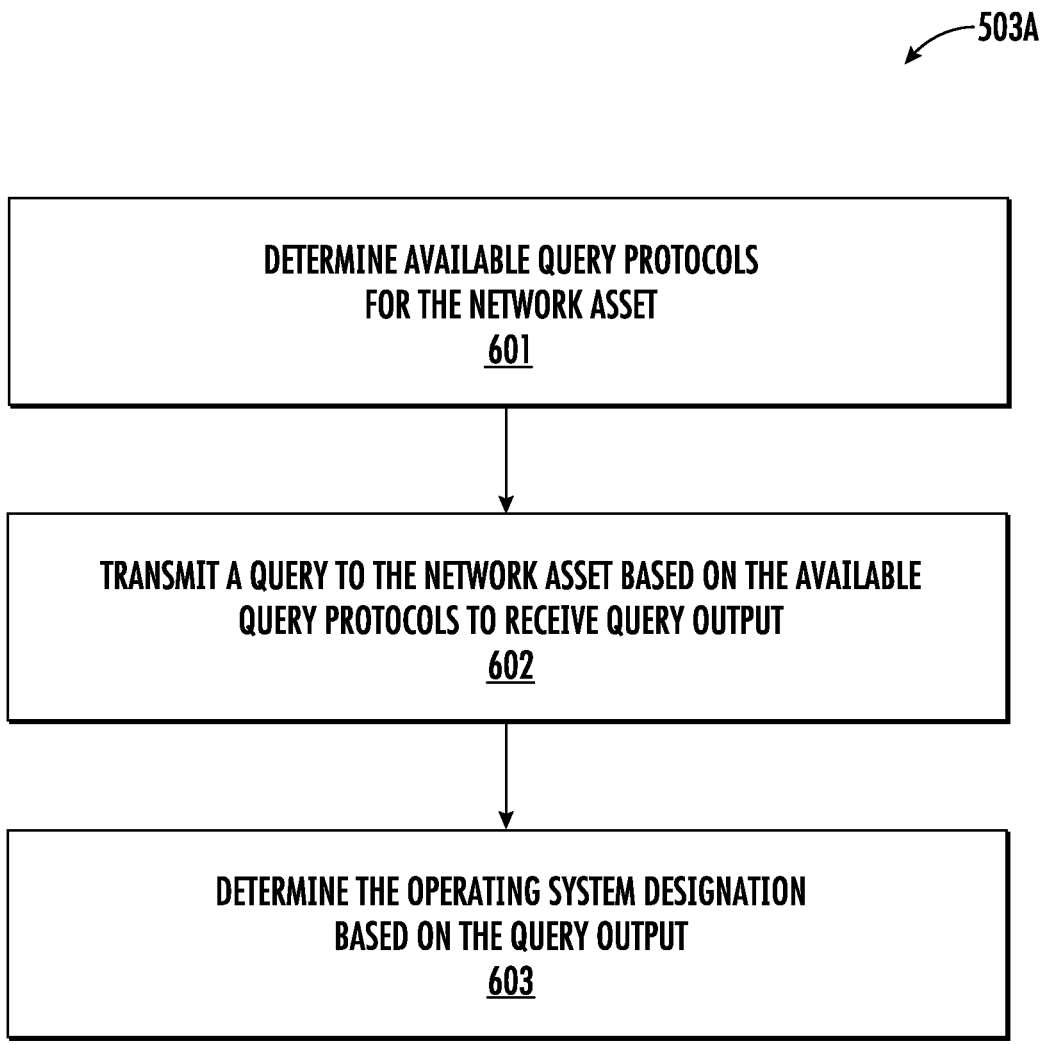

FIG. 6 is a flowchart diagram of an example process for determining an operating system designation for a network asset using a query-based data collection technique in accordance with some embodiments discussed herein.

Figure 7:
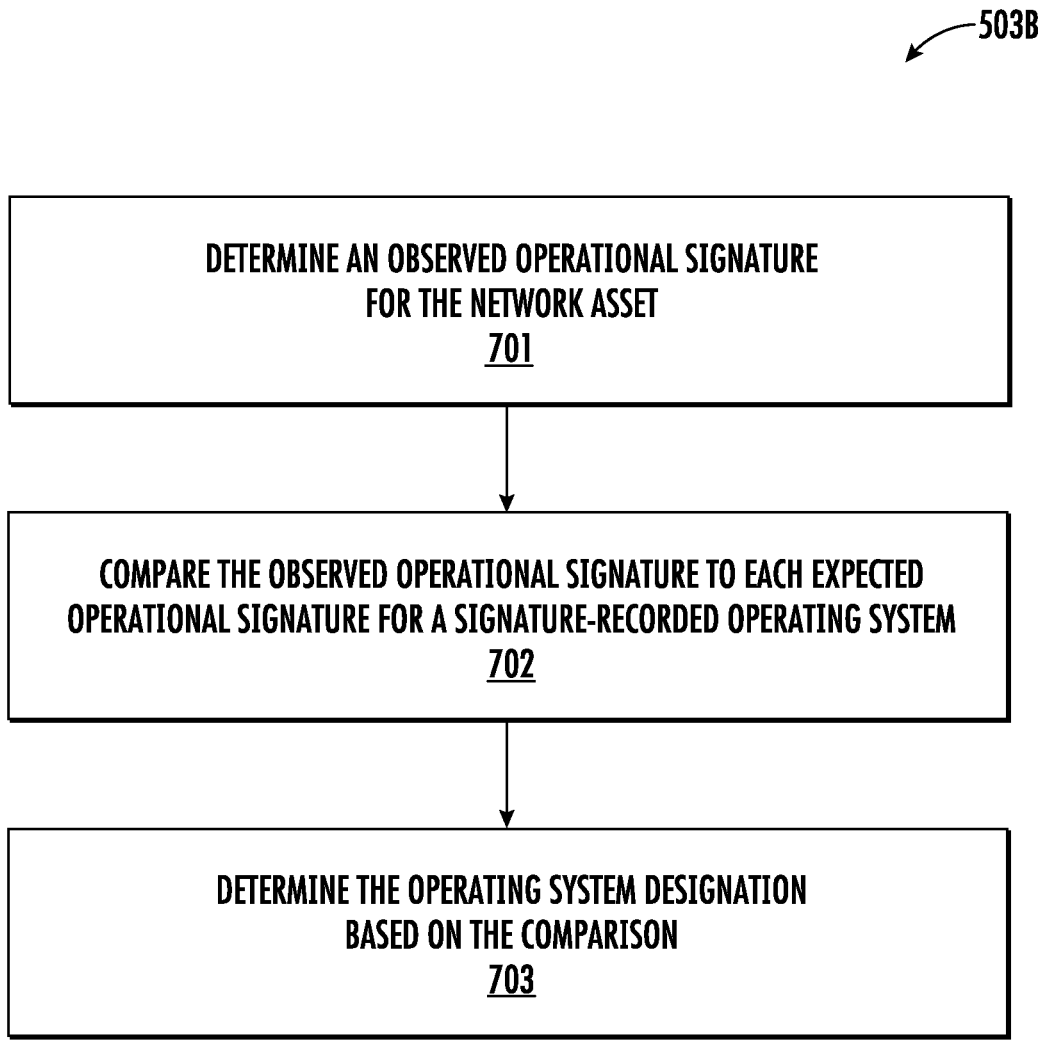

FIG. 7 is a flowchart diagram of an example process determining an operating system designation for a network asset using an operational-signature-based data collection technique in accordance with some embodiments discussed herein.

Figure 8:
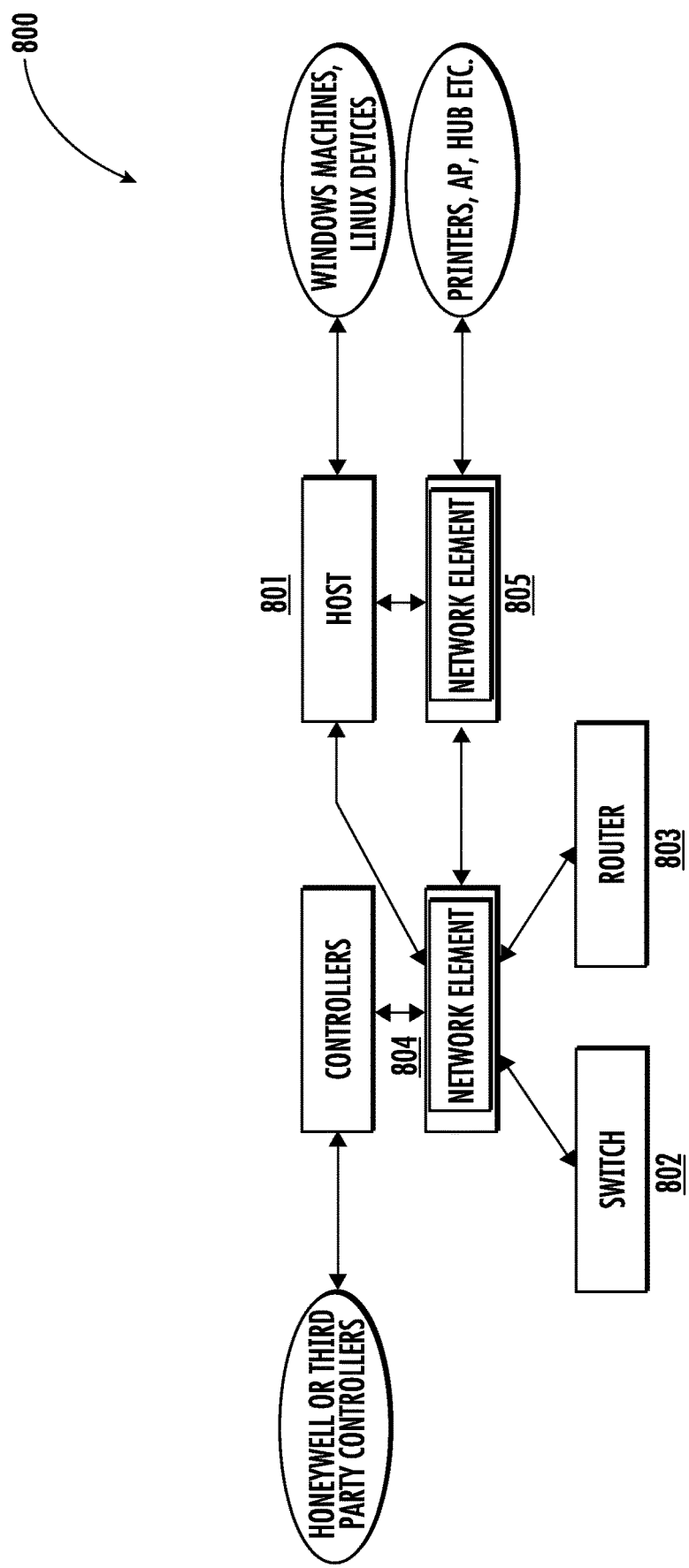

FIG. 8 provides an operational example of a network functionality designation data object in accordance with some embodiments discussed herein.

Figure 9:
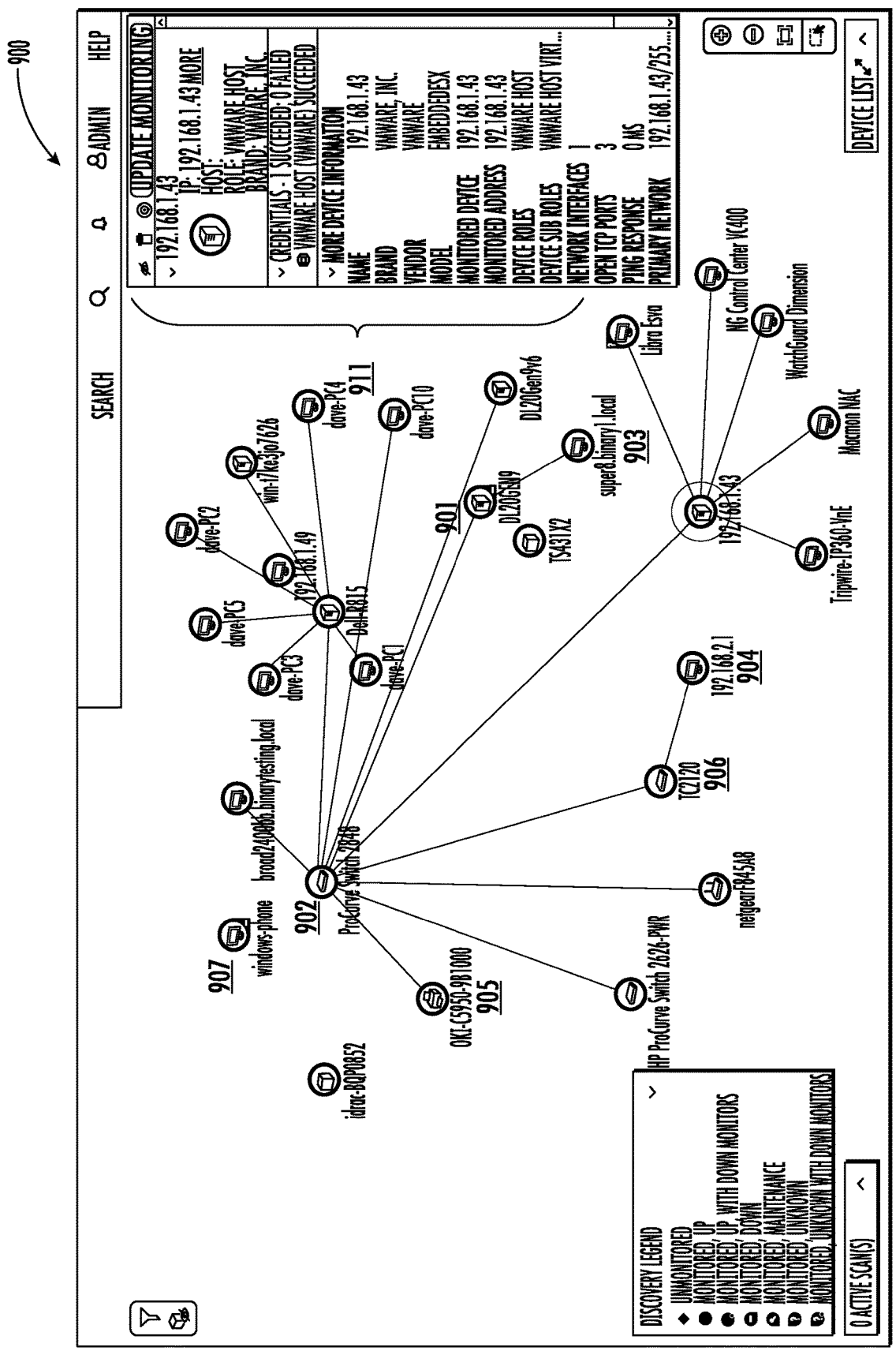

FIG. 9 provides an operational example of a network vulnerability detection user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. OVERVIEW

Various embodiments of the present invention provide techniques for detecting network asset vulnerability for one or more monitored computer networks. For example, various embodiments of the present invention provide techniques for detecting vulnerable network assets by generating vulnerability profiles for the network assets and comparing the vulnerability profiles against network asset vulnerability repositories to determine whether the networked assets are vulnerable. As another example, various embodiments of the present invention provide techniques for decoupling a vulnerable network asset based on a connectivity profile of the network asset. By disclosing the above-noted techniques and similar techniques discussed herein, various embodiments of the present invention increase security and reliability of networked computer systems. In doing so, various embodiments of the present invention make important technical contributions to computer networking and substantially improve security and reliability of existing networked computer systems.

II. COMPUTER PROGRAM PRODUCTS, METHODS, AND COMPUTING DEVICES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing devices, and/or the like. As such, embodiments of the present invention may take the form of an apparatus, system, computing device, computing device, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing devices, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing network asset vulnerability detection. The architecture 100 includes a network security computing device 106 that is configured to receive network-security-related requests from client computing devices 102 and process the network-security-related requests to provide outputs about security of monitored computer networks and/or to perform actions configured to rectify security vulnerabilities of monitored computer networks.

In some embodiments, network security computing device 106 may communicate with at least one of the client computing devices 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The network security computing device 106 may include a storage subsystem. The storage subsystem may include one or more storage units, such as multiple distributed storage units that are connected through a computer network. Each storage unit in the storage subsystem may store at least one of one or more data assets and/or one or more data about the computed properties of one or more data assets. Moreover, each storage unit in the storage subsystem may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Network Security Computing Device

FIG. 2 provides a schematic of an network security computing device 106 according to one embodiment of the present invention. In general, the terms computing device, computer, entity, device, system, and/or similar words used herein interchangeably may refer to, for example, one or more computers, computing devices, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network security computing device 106 may also include one or more communications interfaces 220 for communicating with various computing devices, such as by communicating data, content, information, and/or similar terms used herein interchangeably that can be transmitted, received, operated on, processed, displayed, stored, and/or the like.

As shown in FIG. 2, in one embodiment, the network security computing device 106 may include or be in communication with one or more processing elements 205 (also referred to as processors, processing circuitry, and/or similar terms used herein interchangeably) that communicate with other elements within the network security computing device 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the network security computing device 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network security computing device 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the network security computing device 106 with the assistance of the processing element 205 and operating system.

As indicated, in one embodiment, the network security computing device 106 may also include one or more communications interfaces 220 for communicating with various computing devices, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the network security computing device 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the network security computing device 106 may include or be in communication with one or more input elements, such as a keyboard input, a mouse input, a touch screen/display input, motion input, movement input, audio input, pointing device input, joystick input, keypad input, and/or the like. The network security computing device 106 may also include or be in communication with one or more output elements (not shown), such as audio output, video output, screen/display output, motion output, movement output, and/or the like.

Exemplary Client Computing device

FIG. 3 provides an illustrative schematic representative of a client computing device 102 that can be used in conjunction with embodiments of the present invention. In general, the terms device, system, computing device, entity, and/or similar words used herein interchangeably may refer to, for example, one or more computers, computing devices, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing devices 102 can be operated by various parties. As shown in FIG. 3, the client computing device 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing device 102 may be capable of operating with one or more air interface standards, communication protocols, modulation types, and access types. More particularly, the client computing device 102 may operate in accordance with any of a number of wireless communication standards and protocols, such as those described above with regard to the network security computing device 106. In a particular embodiment, the client computing device 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing device 102 may operate in accordance with multiple wired communication standards and protocols, such as those described above with regard to the network security computing device 106 via a network interface 320.

Via these communication standards and protocols, the client computing device 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing device 102 can also download changes, add-ons, and updates, for instance, to its firmware, software (e.g., including executable instructions, applications, program modules), and operating system.

According to one embodiment, the client computing device 102 may include location determining aspects, devices, modules, functionalities, and/or similar words used herein interchangeably. For example, the client computing device 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing device's 102 position in connection with a variety of other systems, including cellular towers, Wi-Fi access points, and/or the like. Similarly, the client computing device 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing device 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing device 102 to interact with and/or cause display of information/data from the network security computing device 106, as described herein. The user input interface can comprise any of a number of devices or interfaces allowing the client computing device 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing device 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing device 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing device 102. As indicated, this may include a user application that is resident on the entity or accessible through a browser or other user interface for communicating with the network security computing device 106 and/or various other computing devices.

In another embodiment, the client computing device 102 may include one or more components or functionality that are the same or similar to those of the network security computing device 106, as described in greater detail above. As will be recognized, these architectures and descriptions are provided for exemplary purposes only and are not limiting to the various embodiments.

In various embodiments, the client computing device 102 may be embodied as an artificial intelligence (AI) computing device, such as an Amazon Echo, Amazon Echo Dot, Amazon Show, Google Home, and/or the like. Accordingly, the client computing device 102 may be configured to provide and/or receive information/data from a user via an input/output mechanism, such as a display, a camera, a speaker, a voice-activated input, and/or the like. In certain embodiments, an AI computing device may comprise one or more predefined and executable program algorithms stored within an onboard memory storage module, and/or accessible over a network. In various embodiments, the AI computing device may be configured to retrieve and/or execute one or more of the predefined program algorithms upon the occurrence of a predefined trigger event.

IV. EXEMPLARY SYSTEM OPERATIONS

FIG. 4 is a flowchart diagram of an example process 400 for network asset vulnerability detection. Via the various operations of the process 400, the network security computing device 106 can detect network assets within monitored computer networks, detect potential vulnerabilities of the detected network assets, decouple the detected network assets from the monitored computer networks based on inferred mappings of the monitored computer networks, and provide graph-based user interfaces that contain information about potential vulnerabilities and related network configuration settings of the monitored computer networks to client computing devices 102 of network administrator user profiles associated with the monitored computer networks. While various embodiments of the present invention are described with reference to performing network asset vulnerability detection on network assets in a single monitored computer network, a person of ordinary skill in the relevant technology will recognize that the disclosed techniques can be utilized to perform network asset vulnerability detection on network assets in two or more monitored computer networks.

The process 400 begins at operation 401 when the network security computing device 106 receives a network asset vulnerability detection request for the monitored computer network. The network asset vulnerability detection request may be a request transmitted to the network security computing device 106 (e.g., by a client computing device 102), where the request seeks updating by the network security computing device 106 of at least a portion of network asset vulnerability detection data for the monitored computer network. The network asset vulnerability detection data for a monitored computer network is a data object that includes the most recent list of detected network assets within the monitored computer network, the most recent vulnerability profile of each detected network asset, and the most recent connectivity profile of each detected network asset. Network asset detection, vulnerability profiles, and connectivity profiles are described in greater detail below with reference to operation 402.

In some embodiments, the network asset vulnerability detection request is transmitted to the network asset vulnerability detection request via an application programming interface (API) call that is associated with an API for the network security computing device 106. In some embodiments, the API for the network security computing device 106 is a microweb-framework-based API, such as a Flask-based API. In some embodiments, the network asset vulnerability detection request is generated by an API of the network security computing device 106 periodically (e.g., every minute).

At operation 402, in response to the network asset vulnerability detection request, the network security computing device 106 updates network asset vulnerability detection data for the monitored computer network. As noted above, the network asset vulnerability detection data for a monitored computer network is a data object that includes the most recent list of detected network assets within the monitored computer network, the most recent vulnerability profile of each detected network asset, and the most recent connectivity profile of each detected network asset. The vulnerability profile for a network asset is a data object that describes one or more operational capabilities of the network asset, where the one or more operational capabilities may include operational capabilities that are deemed to have the highest correlation with network vulnerability and exposure based on a network vulnerability documentation repository (e.g., the Common Vulnerabilities and Exposures (CVE) repository maintained by the Mitre Corporation). In some embodiments, the vulnerability profile for a network asset comprises: (i) an operating system designation for the network asset, (ii) an open ports list for the network asset, and (iii) a network functionality designation for the network asset.

The connectivity profile for a network asset is a data object that describes other networked assets that are linked to the network asset within the monitored computer network. For example, as depicted in the network vulnerability detection user interface 900 of FIG. 9, the connectivity profile for the network asset 901 may indicate that the network asset 901 is linked to network asset 902 and network asset 903. As another example, the connectivity profile for the network asset 906 may indicate that the network asset 901 is linked to network asset 902 and network asset 904. As yet another example, the connectivity profile for the network asset 905 may indicate that the network asset 905 is linked to network asset 902. In some embodiments, the connectivity profile for a network asset within a monitored computer network may describe network assets outside the monitored computer network that are detected to be linked to the particular network asset.

Before detecting per-asset vulnerability profiles and per-asset connectivity profiles for particular network assets, the network security computing device 106 may further determine an updated list of network assets (e.g., a list of active hosts) within the monitored computer network. To determine an updated list of network assets within the monitored computer network, the network security computing device 106 may utilize any of various network asset discovery assets. In some embodiments, to determine the updated list of network assets within the monitored computer network, the network security computing device 106 performs a number of network asset detection operations and determines that a network asset is a detected network asset if the network asset is detected by at least one of the number of network asset detection operations. In some embodiments, to determine the updated list of network assets within the monitored computer network, the network security computing device 106 performs a number of network asset detection operations and determines that a network asset is a detected network asset if the network asset is detected by at least n of network asset detection operations, where n may be a hyper-parameter and/or a configuration parameter of the network security computing device 106. Examples of network asset detection methods that can be utilized by the network security computing device 106 include methods that utilize at least one of Internet Control Message Protocol (ICMP) pinging using ICMP echo packets, ICMP pinging using ICMP timestamp packets, Transmission Control Protocol (TCP) pinging using TCP SYN packets, TCP pinging using TCP ACK packets, and Address Resolution Packet (ARP) protocol pinging using ARP protocol pings.

In some embodiments, operation 402 may be performed in accordance with the process depicted in FIG. 5. The process depicted in FIG. 5 begins at operation 501 when the network security computing device 106 detects a plurality of network assets within the monitored computer network. In some embodiments, detecting the plurality of network assets comprises determining, using an ICMP echo packet, whether a previously-discovered network asset is active; and in response to determining that the previously-discovered network asset is active, determining the previously-discovered network as a network asset of the plurality of network assets. In some of the noted embodiments, to determine whether the previously-discovered network asset is active, the network security computing device 106 transmits an ICMP echo packet and determines whether the previously-discovered network asset is active based on whether the network security computing device receives a ICMP echo reply packet from the previously-discovered network asset in response to the ICMP echo packet that was transmitted to the previously-discovered network asset.

In some embodiments, detecting the plurality of network assets comprises determining, using an ICMP timestamp packet, whether a previously-discovered network asset is active; and in response to determining that the previously-discovered network asset is active, determining the previously-discovered network as a network asset of the plurality of network assets. In some of the noted embodiments, to determine whether the previously-discovered network asset is active, the network security computing device 106 transmits an ICMP timestamp packet and determines whether the previously-discovered network asset is active based on whether the network security computing device receives a ICMP timestamp reply packet from the previously-discovered network asset in response to the ICMP timestamp packet that was transmitted to the previously-discovered network asset.

In some embodiments, detecting the plurality of network assets comprises determining, using a TCP SYN packet, whether a previously-discovered network asset is active; and in response to determining that the previously-discovered network asset is active, determining the previously-discovered network as a network asset of the plurality of network assets. In some of the noted embodiments, to determine whether the previously-discovered network asset is active, the network security computing device 106 transmits a TCP SYN packet and determines whether the previously-discovered network asset is active based on whether the network security computing device receives a TCP SYN/ACK packet from the previously-discovered network asset in response to the TCP SYN packet that was transmitted to the previously-discovered network asset.

In some embodiments, detecting the plurality of network assets comprises determining, using a TCP ACK packet, whether a previously-discovered network asset is active; and in response to determining that the previously-discovered network asset is active, determining the previously-discovered network as a network asset of the plurality of network assets. In some of the noted embodiments, to determine whether the previously-discovered network asset is active, the network security computing device 106 transmits a TCP ACK packet and determines whether the previously-discovered network asset is active based on whether the network security computing device receives a reset (RST) packet from the previously-discovered network asset in response to the TCP ACK packet that was transmitted to the previously-discovered network.

In some embodiments, detecting the plurality of network assets comprises determining, using an ARP ping packet, whether a previously-discovered network asset is active; and in response to determining that the previously-discovered network asset is active, determining the previously-discovered network as a network asset of the plurality of network assets. In some of the noted embodiments, to determine whether the previously-discovered network asset is active, the network security computing device 106 transmits an ARP ping packet and determines whether the previously-discovered network asset is active based on whether the network security computing device receives a ping-responsive packet from the previously-discovered network asset in response to the ARP ping packet that was transmitted to the previously-discovered network asset.

At operation 502, the network security computing device 106 determines an open ports list for each network asset detected at operation 501. The open ports list for a corresponding network asset is a data object that describes at least a portion of the open ports of the network asset. For example, the open ports list for a corresponding network asset may describe all open ports of the network asset. As another example, the open ports list for a corresponding network may describe all open ports of the network asset that are not expected to be kept open based on the relevant protocols associated with those ports. In some embodiments, to detect open ports of a network asset, the network security computing device 106 utilizes an open port scanner software, such as the open port scanner of the Nmap Network Mapper software. In some embodiments, to detect open ports of a network asset, the network security computing device 106 analyzes all ports (e.g., all TCP ports and/or all User Datagram Protocol (UDP) ports) of the network asset in order to determine, based on port scanner output data for the network asset, which of the noted collection of ports is an open port and which is not.

At operation 503, the network security computing device 106 determines an operating system designation for each network asset detected at operation 501. The operating system designation for a corresponding network asset is a data object that describes the operating system of the network asset. For example, the operating system designation for a corresponding network asset may indicate that the network asset has a Windows operating system. As another example, the operating system designation for a corresponding network asset may indicate that the network asset has a Linux operating system. As yet another example, the operating system designation for a corresponding network asset may indicate that the network asset has no running host operating system.

In some embodiments, operation 503 may be performed with respect to a particular network asset in accordance with the process depicted in FIG. 6. The process depicted in FIG. 6 begins at operation 601 when the network security computing device 106 determines, based on the open ports list for the network asset, one or more available query protocols for the network asset. An available query protocol is a protocol for requesting and obtaining data from a query-receiving computing device, where the packets corresponding to the protocol are configured to be transmitted using a port that is marked as an open port by the open ports list for the query-receiving computing device. Examples of available query protocols may include the Secure Shell (SSH) protocol, a Windows Management Instrumentation (WMI) protocol, and one or more connection-less protocols such as a Simple Network Management Protocol (SNMP) and a NetBIOS Name Server (NBNS) protocol.

For example, in some embodiments, to determine an available query protocol for the network asset, the network security computing device 106 first determines whether the open ports list for the network asset comprises TCP port number 22. In some of the noted embodiments, if the network security computing device 106 determines that the open ports list for the network asset comprises TCP port number 22, the network security computing device 106 proceeds to determine SSH as an available query protocol, as SSH packets can be transmitted via the TCP port number 22.

As another example, in some embodiments, to determine an available query protocol for the network asset, the network security computing device 106 first determines whether the open ports list for the network asset comprises TCP port number 135. In some of the noted embodiments, if the network security computing device 106 determines that the open ports list for the network asset comprises TCP port number 135, the network security computing device 106 proceeds to determine WMI as an available query protocol, as SSH packets can be transmitted via the TCP port number 135.

As yet another example, in some embodiments, to determine an available query protocol for the network asset, the network security computing device 106 first determines whether the open ports list for the network asset comprises UDP port number 161. In some of the noted embodiments, if the network security computing device 106 determines that the open ports list for the network asset comprises UDP port number 161, the network security computing device 106 proceeds to determine WMI as an available query protocol, as SSH packets can be transmitted via the UDP port number 161.

As a further example, in some embodiments, to determine an available query protocol for the network asset, the network security computing device 106 first determines whether the open ports list for the network asset comprises UDP port number 137 or TCP port 137. In some of the noted embodiments, if the network security computing device 106 determines that the open ports list for the network asset comprises UDP port number 137 or TCP port 137, the network security computing device 106 proceeds to determine WMI as an available query protocol, as SSH packets can be transmitted via the UDP port number 137 or TCP port 137.

At operation 602, the network security computing device 106 transmits a query to the network asset based on the available query protocols in order to receive a query output. For example, if the available query protocol is the SSH protocol, the network security computing device 106 transmits an SSH query in order to receive an SSH output. As another example, if the available query protocol is the WMI protocol, the network security computing device 106 transmits an WMI query in order to receive an WMI output. As yet another example, if the available query protocol is the SNMP protocol, the network security computing device 106 transmits an SNMP query in order to receive an SNMP output. As a further example, if the available query protocol is the NBNS protocol, the network security computing device 106 transmits an NBNS query in order to receive an NBNS output.

In some embodiments, the query includes authentication information associated with an authorized user profile of the network asset. For example, the SSH query may include username and password of an authorized user profile of the network asset. In some embodiments, given a query that is generated according to a corresponding available query protocol, the authentication information are integrated into the query protocol based on the custom protocol settings of the available query protocol. In some embodiments, the query is configured to request at least one of the operating system of the network asset, the services running on the network asset, network application software components running on the network asset, and/or the like.

At operation 603, the network security computing device 106 determines the operating system designation of the network asset based on the query output received from the network asset. In some embodiments, at least one field of the query output indicates an operating system designation of the network asset, and the network security computing device 106 determines the operating system designation for the network asset based at least in part on the noted at least one field of the query output received from the network asset. For example, the operating system designation for a corresponding network asset may indicate that the network asset has a Windows operating system. As another example, the operating system designation for a corresponding network asset may indicate that the network asset has a Linux operating system. As yet another example, the operating system designation for a corresponding network asset may indicate that the network asset has no running host operating system.

Returning to FIG. 5, operation 503 may alternatively be performed with respect to a particular network asset in accordance with the process depicted in FIG. 7, which in some embodiments may be performed if the query-based data collection method of FIG. 6 is not effective, for example due to lack of access to authentication information needed to successfully retrieve query outputs using a query generated based on available query protocol. The process depicted in FIG. 7 begins at operation 701 when the network security computing device 106 determines an observed operational signature of the network asset. The observed operational signature of the network asset may be a data object that describes one or more properties of network communications actions performed by the corresponding network asset. For example, the observed operational signature of a corresponding network asset may describe time-to-live (TTL) parameter of particular networking packets (e.g., TCP networking packets) received from the corresponding network asset. As another example, the observed operational signature of a corresponding network may describe whether the network asset replies to a particular packet delivered to a particular open port of the network asset.

At operation 702, the network security computing device 106 compares the observed operational signature of the network asset to each expected operational signature for a signature-recorded operating system of two or more signature-recorded operating systems. The expected operational signature for a corresponding operating system may be a data object that describes one or more expected properties of network communications actions performed by network assets that utilize the corresponding operating system. For example, the expected operational signature for a Windows operating system may describe that the Windows-based network assets have a default of 128 hops in the TTL parameters of their TCP packets, while the expected operational signature for a Linux operating system may describe that the Linux-based network assets have a default of 64 hops in the TTL parameters of their TCP packets. As another example, the expected operational signature for a particular operating system having a particular firewall application that blocks incoming packets to a particular open port may indicate that the network assets utilizing the particular operating system are expected to fail to reply to networking packets that are transmitted to the particular open port.

At operation 703, the network security computing device 106 determines the operating system designation for the network asset based on the comparison of the observed operational signature of the network asset and each expected operational signature for a signature-recorded operating system of two or more signature-recorded operating systems. For example, the operating system designation for a corresponding network asset may indicate that the network asset has a Windows operating system. As another example, the operating system designation for a corresponding network asset may indicate that the network asset has a Linux operating system. As yet another example, the operating system designation for a corresponding network asset may indicate that the network asset has no running host operating system.

For example, the network security computing device 106 may determine that a selected one of the two or more signature-recorded operating systems has an expected operational signature that matches the observed operational signature of the network asset. In the noted example, subsequent to the noted determination, the network security computing device 106 may proceed to adopt the selected signature-recorded operating system as the operating system designation for the corresponding network asset.

As another example, the network security computing device 106 may calculate a matching score for each signature-recorded operating system of the two or more signature-recorded operating systems with respect to the observed operational signature of the network asset. In the noted example, network security computing device 106 may determine that a selected signature-recorded operating system of the two or more signature-recorded operating systems having a highest matching score among the matching scores of the two or more signature-recorded operating systems is the operating system designation for the network asset.

In some embodiments, determining the vulnerability profile for a network asset of the plurality of network assets comprises receiving a networking packet from the network asset, wherein the networking packet comprises a TTL parameter for the network asset, and determining the operating system designation for the network asset based on the TTL parameter. In some embodiments, determining the vulnerability profile for a network asset of the plurality of network assets comprises determining the operating system designation of the network asset based on performing operating system fingerprinting operations with respect to the network asset.

Returning to FIG. 5, at operation 504, the network security computing device 106 determines a network functionality designation for each network asset. The network functionality designation for a network asset may be a data object that describes a detected role of the network asset within the monitored computer network. For example, the network functionality designation for a network asset may indicate that the noted network asset is a host, is a switch, is a router, is an undetected-type networking device, and/or the like.

In some embodiments, the network functionality designation for a network asset is determined based on at least one of the operating system designation for the network asset and additional information about the network asset, such as additional information determined using query-based data collection techniques such as the query-based data collection techniques of FIG. 6 and/or additional information determined using operational-signature-based information retrieval techniques such operational-signature-based information retrieval techniques of FIG. 7.

In some embodiments, to determine whether the network functionality designation of the network asset is a host functionality designation or a networking-device functionality designation, the network security computing device 106 determines whether the operating system designation for the network asset is a host asset operating system (e.g., is Windows or Linux). In some of the noted embodiments, if the network security computing device 106 determines that the operating system designation for the network asset is a host asset operating system, the network security computing device 106 determines that the network asset is a host network asset. In some of the noted embodiments, if the network security computing device 106 determines that the operating system designation for the network asset is not a host asset operating system, the network security computing device 106 determines that the network asset is a networking-device network asset for the monitored computer network, such as a router asset for the monitored computer network or a switch asset for the monitored computer network.

An operational example of a network functionality designation data object 800 is depicted in FIG. 8. As depicted in FIG. 8, the network functionality designation data object 800 provides (in addition to links between the depicted network assets) a network functionality designation for each network asset. For example, as depicted in the network functionality designation data object 800 of FIG. 8, the network asset 801 is a host, the network asset 802 is a switch, the network asset 803 is a router, and network assets 804-805 are undetected-type networking devices.

Returning to FIG. 5, at operation 505, the network security computing device 106 determines the connectivity profile for the network asset. The connectivity profile for the network asset may include a connected asset network asset describing a linked subset of the plurality of network assets for the network asset. In some embodiments, to determine the connectivity profile for each network asset, the network security computing device 106 may detect links between the network assets of the monitored computer network. To do so, the network security computing device 106 may perform a network packet capture of a group of network packets (e.g., a sampled group of network packets) across the monitored computer network. In some of the noted embodiments, determining the connectivity profile for a network asset comprises identifying one or more captured communication packets transmitted using the monitored computer network, determining, based on the one or more captured communication packets, one or more communication links between the plurality of network assets, and determining the connectivity profile based on a subset of the one or more communication links that is associated with the network asset.

Returning to FIG. 4, at operation 403, the network security computing device 106 receives a network vulnerability remediation request. The network vulnerability remediation request may be a request transmitted to the network security computing device 106 (e.g., by a client computing device 102), where the request seeks addressing one or more network asset vulnerabilities indicated by the network asset vulnerability detection data based on each connectivity profile for a network asset of the one or more network assets. In some embodiments, the network vulnerability remediation request is transmitted to the network asset vulnerability detection request via an API call that is associated with an API for the network security computing device 106. In some embodiments, the API for the network security computing device 106 is a microweb-framework-based API, such as a Flask-based API. In some embodiments, the network asset vulnerability detection request is generated by an API of the network security computing device 106 periodically (e.g., every minute).

At operation 404, in response to the network vulnerability remediation request, the network security computing device 106 determines a vulnerability designation for each network asset based on the vulnerability profile for the network asset and a network vulnerability documentation repository. The network vulnerability documentation repository may be a data object that describes combinations of operational conditions that have been shown and/or are estimated to pose network security exposure risks. An example of a network vulnerability documentation repository is the CVE repository.

At operation 405, in response to determining that the vulnerability designation for a network asset indicates a positive vulnerability designation, the network security computing device 106 decouples the network asset from the monitored computer network using the connectivity profile for the network asset. A positive vulnerability designation may be a data object that indicates that a corresponding network asset is deemed to be vulnerable. For example, the network security computing device 106 may determine that a corresponding network asset has a positive vulnerability designation if the vulnerability profile of the corresponding network asset corresponds to a scenario designated as vulnerable on the network vulnerability documentation repository. As another example, the network security computing device 106 may determine that a corresponding network asset has a positive vulnerability designation if a vulnerability score of the corresponding network asset determined based on processing the vulnerability profile of the corresponding network asset using a vulnerability score generation routine defined by the network vulnerability documentation repository exceeds a vulnerability score threshold. An example of a vulnerability score is a vulnerability score determined using the Common Vulnerability Scoring System (CVSS) of the CVE.

In some embodiments, to decouple a network asset, the network security computing device 106 deactivates and/or disconnects all the links to the network asset within the monitored computer network as indicated by the connectivity profile for the network asset. In some embodiments, the network security computing device 106 provides a progress update about decoupling to an administrator user profile of the monitored computer network. For example, as depicted in the network vulnerability detection user interface 900 of FIG. 9, despite the fact that both the network asset 901 and the network asset 907 are deemed vulnerable, the network asset 907 has been successfully decoupled, while the network asset 901 has not been successfully decoupled.

In some embodiments, the network security computing device 106 presents a network vulnerability detection user interface, such as the network vulnerability detection user interface 900 of FIG. 9. As depicted in FIG. 9, in the network vulnerability detection user interface 900 depicts, for each network asset of the corresponding monitored computer network, the vulnerability profile of the network asset upon clicking on an icon of the network asset. For example, the user interface element 911 depicts the vulnerability profile of the network asset 904. As further depicted in FIG. 9, in the network vulnerability detection user interface 900 depicts, for each network asset of the corresponding monitored computer network, the connectivity profile of the network using the edges of the graph interface element depicted in the network vulnerability detection user interface 900.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for network asset vulnerability detection within a monitored computer network, the computer-implemented method comprising:
   detecting a plurality of network assets within the monitored computer network; and
   for each network asset of the plurality of network assets:
      determining a vulnerability profile for the network asset, wherein the vulnerability profile for the network asset comprises: (i) an operating system designation for the network asset, (ii) an open ports list for the network asset, and (iii) a network functionality designation for the network asset;
      determining a connectivity profile for the network asset, wherein the connectivity profile for the network asset comprises a connected asset network asset describing a linked subset of the plurality of network assets for the network asset;
      determining a vulnerability designation for the network asset based on the vulnerability profile for the network asset and a network vulnerability documentation repository;
      determining whether the vulnerability designation for the network asset indicates a positive vulnerability designation; and
      in response to determining that the vulnerability designation indicates the positive vulnerability designation, decoupling the network asset from the monitored computer network using the connectivity profile for the network asset.

2. The computer-implemented method of claim 1, wherein detecting the plurality of network assets comprises:
   determining, using an Internet Control Message Protocol echo packet, whether a previously-discovered network asset is active; and
   in response to determining that the previously-discovered network asset is active, determining the previously-discovered network as a network asset of the plurality of network assets.

3. The computer-implemented method of claim 1, wherein detecting the plurality of network assets comprises:
   determining, using a Transmission Control Protocol SYN packet, whether a previously-discovered network asset is active; and
   in response to determining that the previously-discovered network asset is active, determining the previously-discovered network as a network asset of the plurality of network assets.

4. The computer-implemented method of claim 1, wherein detecting the plurality of network assets comprises:
   determining, using a Transmission Control Protocol ACK packet, whether a previously-discovered network asset is active; and
   in response to determining that the previously-discovered network asset is active, determining the previously-discovered network as a network asset of the plurality of network assets.

5. The computer-implemented method of claim 1, wherein detecting the plurality of network assets comprises:

determining, an Internet Control Message Protocol timestamp packet, whether a previously-discovered network asset is active; and in response to determining that the previously-discovered network asset is active, determining that the previously-discovered network as a network asset of the plurality of network assets.

6. The computer-implemented method of claim 1, wherein detecting the plurality of network assets comprises:

determining, using an Address Resolution Packet protocol ping packet, whether a previously-discovered local network asset is active; and in response to determining that the previously-discovered local network asset is active, determining the previously-discovered local network as a network asset of the plurality of network assets.

7. The computer-implemented method of claim 1, wherein determining the vulnerability profile for a network asset of the plurality of network assets comprises:

determining, based on the open ports list for the network asset, an available query protocol for the network asset;

transmitting a query to the network asset based on the available query protocol in order to receive a query output; and determining the vulnerability profile based on the query output.

8. The computer-implemented method of claim 7, wherein determining the available query protocol for the network asset comprises:

determining whether the open ports list for the network asset comprises a Transmission Control Protocol port twenty-two; and in response to determining that the open ports list for the network asset comprises the Transmission Control Protocol port twenty-two, determining Secure Shell as the available query protocol.

9. The computer-implemented method of claim 1, wherein determining the vulnerability profile for a network asset of the plurality of network assets comprises:

receiving a networking packet from the network asset, wherein the networking packet comprises a time-to-live parameter for the network asset; and determining the operating system designation for the network asset based on the time-to-live parameter.

10. The computer-implemented method of claim 1, wherein determining the vulnerability profile for a network asset of the plurality of network assets comprises:

determining the operating system designation of the network asset based on performing operating system fingerprinting with respect to the network asset.

11. The computer-implemented method of claim 1, wherein the network functionality designation for a network asset of the plurality of network asset is determined based on the operating system designation of the network asset.

12. The computer-implemented method of claim 1, wherein determining the connectivity profile for a network asset of the plurality of network assets comprises:

identifying one or more captured communication packets transmitted using the monitored computer network;

determining, based on the one or more captured communication packets, one or more communication links between the plurality of network assets; and determining the connectivity profile based on a subset of the one or more communication links that is associated with the network asset.

13. An apparatus for network asset vulnerability detection, the apparatus comprising at least one processor and at least one memory including program code, the at least one memory and the program code configured to, with the processor, cause the apparatus to at least:

detect a plurality of network assets within the monitored computer network; and for each network asset of the plurality of network assets:

determine a vulnerability profile for the network asset, wherein the vulnerability profile for the network asset comprises: (i) an operating system designation for the network asset, (ii) an open ports list for the network asset, and (iii) a network functionality designation for the network asset;

determine a connectivity profile for the network asset, wherein the connectivity profile for the network asset comprises a connected asset network asset describing a linked subset of the plurality of network assets for the network asset;

determine a vulnerability designation for the network asset based on the vulnerability profile for the network asset and a network vulnerability documentation repository;

determine whether the vulnerability designation for the network asset indicates a positive vulnerability designation; and in response to determining that the vulnerability designation indicates the positive vulnerability designation, decoupling the network asset from the monitored computer network using the connectivity profile for the network asset.

14. The apparatus of claim 13, wherein determining the vulnerability profile for a network asset of the plurality of network assets comprises:

determining, based on the open ports list for the network asset, an available query protocol for the network asset;

transmitting a query to the network asset based on the available query protocol in order to receive a query output; and determining the vulnerability profile based on the query output.

15. The apparatus of claim 13, wherein determining the vulnerability profile for a network asset of the plurality of network assets comprises:

receiving a networking packet from the network asset, wherein the networking packet comprises a time-to-live parameter for the network asset; and determining the operating system designation for the network asset based on the time-to-live parameter.

16. The apparatus of claim 13, wherein determining the vulnerability profile for a network asset of the plurality of network assets comprises:

determining the operating system designation of the network asset based on performing operating system fingerprinting with respect to the network asset.

17. The apparatus of claim 13, wherein the network functionality designation for a network asset of the plurality of network asset is determined based on the operating system designation of the network asset.

18. The apparatus of claim 13, wherein determining the connectivity profile for a network asset of the plurality of network assets comprises:

identifying one or more captured communication packets transmitted using the monitored computer network;

determining, based on the one or more captured communication packets, one or more communication links between the plurality of network assets; and determining the connectivity profile based on a subset of the one or more communication links that is associated with the network asset.

19. A computer program product for network asset vulnerability detection, the computer program product comprising at least one non-transitory computer-readable storage medium having computer-readable program code stored therein, the computer-readable program code when executed by at least one processor is configured to:

detect a plurality of network assets within the monitored computer network; and for each network asset of the plurality of network assets:

determine a vulnerability profile for the network asset, wherein the vulnerability profile for the network asset comprises: (i) an operating system designation for the network asset, (ii) an open ports list for the network asset, and (iii) a network functionality designation for the network asset;

determine a connectivity profile for the network asset, wherein the connectivity profile for the network asset comprises a connected asset network asset describing a linked subset of the plurality of network assets for the network asset;

determine a vulnerability designation for the network asset based on the vulnerability profile for the network asset and a network vulnerability documentation repository;

determine whether the vulnerability designation for the network asset indicates a positive vulnerability designation; and in response to determining that the vulnerability designation indicates the positive vulnerability designation, decoupling the network asset from the monitored computer network using the connectivity profile for the network asset.

20. The computer program product of claim 19, wherein determining the connectivity profile for a network asset of the plurality of network assets comprises:

identify one or more captured communication packets transmitted using the monitored computer network;

determine, based on the one or more captured communication packets, one or more communication links between the plurality of network assets; and determine the connectivity profile based on a subset of the one or more communication links that is associated with the network asset.

\* \* \* \* \*